Patented Feb. 18, 1941

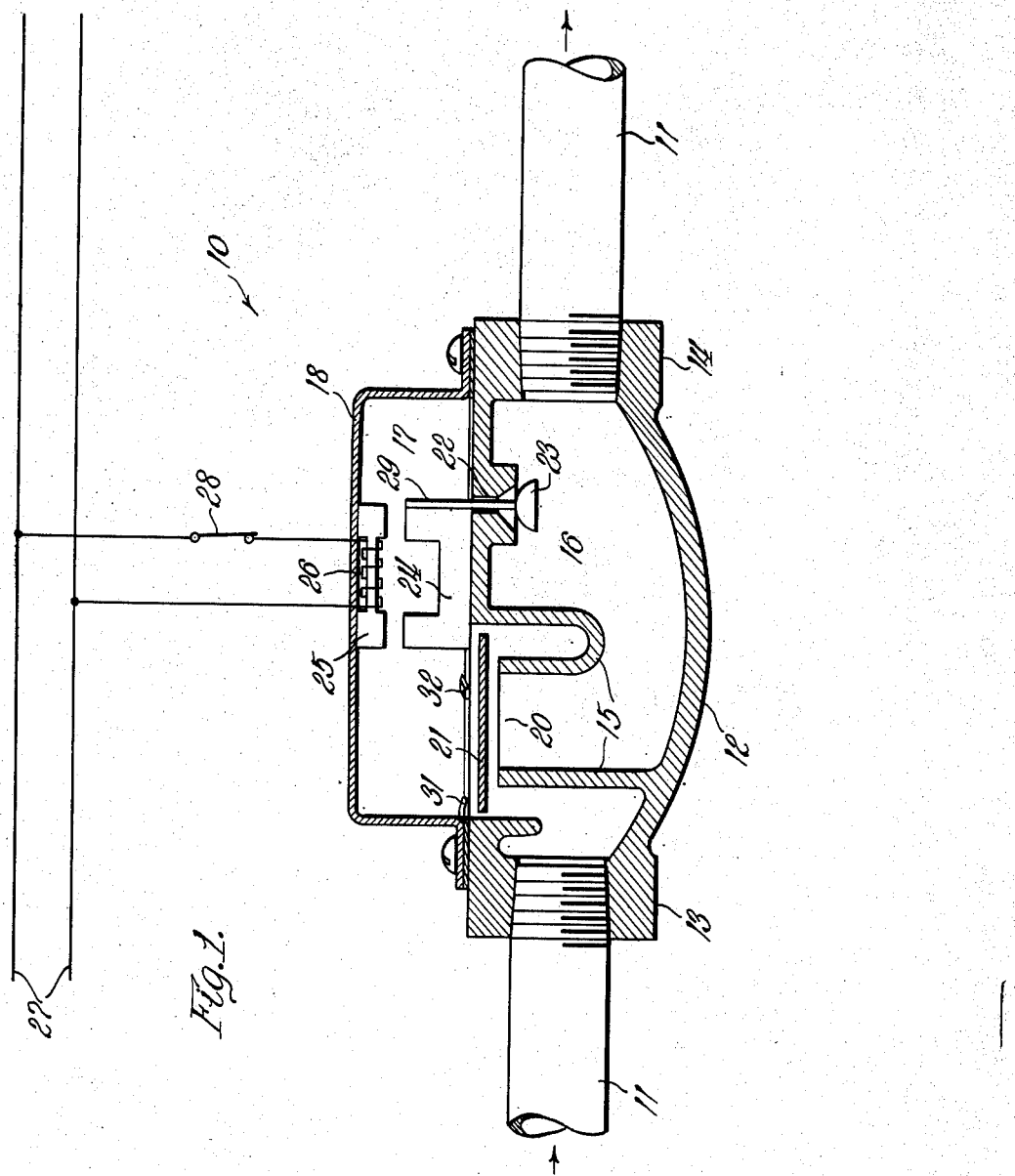

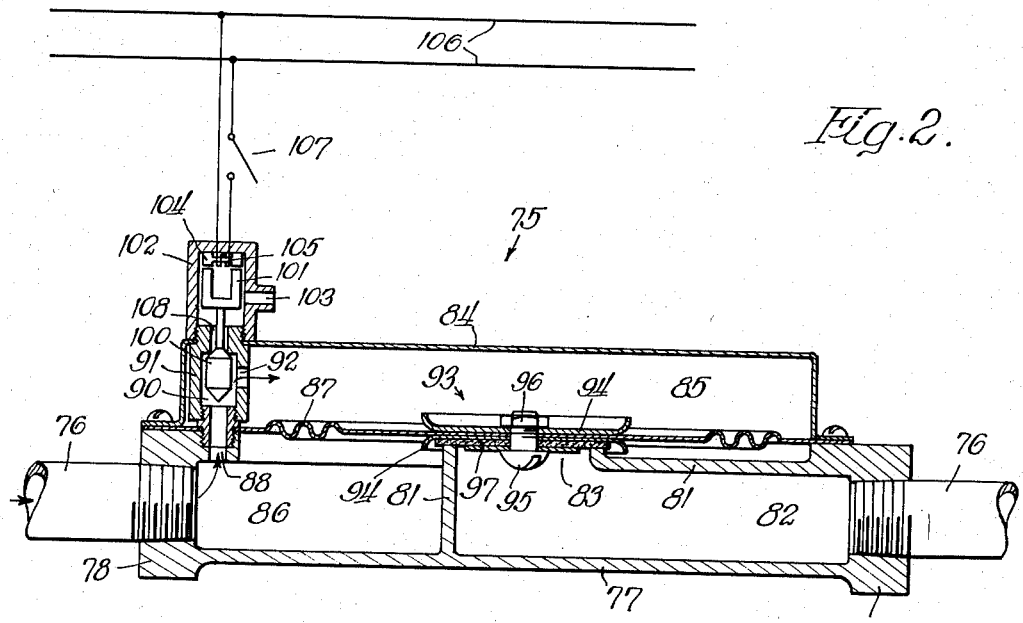
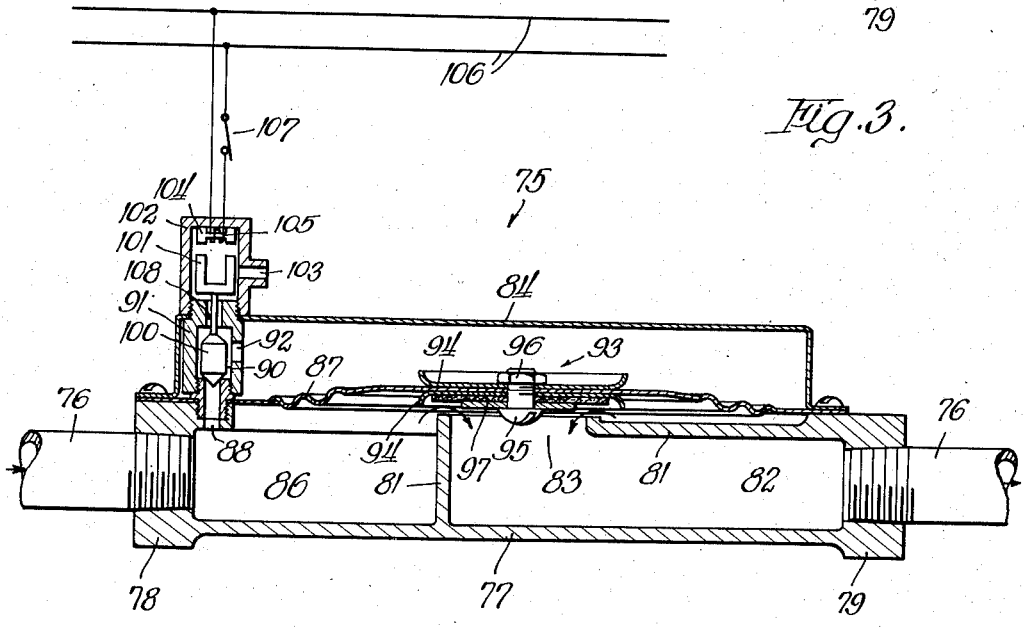

2,232,502

UNITED STATES PATENT OFFICE 2,232,502

APPARATUS FOR CONTROLLING FLUID FLOW

Robert A. Wittmann, Chicago, Ill., assignor to Chicago By-Products Corporation, a corporation of Illinois Application September 6, 1938, Serial No. 228,495

3 Claims. (Cl. 137—139)

My invention relates generally, to apparatus for controlling fluid flow and it has particular relation to bleed valves operated in response to fluid flow and change in the magnetic characteristics of a body of Curie point metal.

The employment of Curie point metals in bleed valves allows important design and operating advantages. By Curie point metals, I refer to those metals and alloys that are normally ferromagnetic but when heated sufficiently become substantially nonmagnetic. The temperature, or Curie point as it is known, at which this change in magnetic characteristics occurs on heating, is distinct for each different Curie point metal. This transformation may be the same on heating and cooling or it may be different, depending on the metal used. For example, the Curie point of nickel lies at 350° C., and it is at the same temperature on heating and cooling. The addition of 2% of chromium lowers the Curie point temperature and causes it to take place over an interval of temperature 240° C.–280° C., on heating. In contrast, the Curie point temperature of cobalt is 1100° C. Thus it is seen that Curie point metals with practically any desired magnetic characteristics may be obtained by using various metals and alloys.

I make use of this change in magnetic characteristics of Curie point metals with change in their temperature for controlling the operation of bleed valves. Electrical energy can be used to regulate the temperature of these Curie point metals and by controlling the electric supply circuit by a thermostat, switch, or any other well known expedient, I provide an electrically controlled valve. I also make these valves operatively responsive to both changes in magnetic characteristics of the Curie point metals and to fluid flow, as will be set forth in the description given hereinafter.

Accordingly, an important object of my invention is to provide bleed valves which are operated in response to fluid flow and to change in the magnetic characteristics of Curie point metals.

Another object of my invention is to provide electrically controlled bleed valves operated in response to fluid flow and to change in the magnetic characteristics of the Curie point metals.

Other objects of my invention will, in part, be obvious and in part appear hereinafter.

Accordingly, my invention is disclosed in the embodiments shown in the accompanying drawings, and it comprises the features of construction, combination of parts and arrangement of elements which will be exemplified in the construction hereinafter set forth and the scope of the application of which will be indicated in the appended claims.

For a more complete understanding of the nature and scope of my invention, reference may be had to the following detailed description, taken in conjunction with the accompanying drawings, in which:

Figure 1 is a view in vertical section, taken parallel to the direction of flow, of a bleed valve illustrating one embodiment of my invention;

Figure 2 is a view in vertical section, taken parallel to the direction of flow, showing the closed position of a bleed valve illustrating another embodiment of my invention; and Figure 3 is a view showing the bleed valve of Figure 2 in the open position.

With a view to providing a bleed valve opened and closed by a free valve member, I have provided such a valve, shown generally at 10 in Figure 1 of the drawings. The valve 10 is connected for operation in a conduit 11 and is made up principally of a valve body 12 with an inlet end 13 and an outlet end 14. The valve body 12 may be a casting of non-ferromagnetic metal. A baffle 15 forms the outlet chamber 16 as shown. A second chamber 17 is formed by the valve cover 18. The valve cover 18 is made of non-ferromagnetic material and it may be held on by screws, as shown. A valve port 20 leads into the outlet chamber 16 and is adapted to be closed by a free valve member 21. It will be noted that the valve member 21 is in the form of a thin disc and is somewhat larger in area than the port 20. The chamber 17 and chamber 16 may be connected by a pressure release port 22 and this port can be closed by a pressure release port valve member 23. In order to close the pressure release port 22 a magnet 24 is provided which carries the pressure release port valve member 23. The magnet 24 is positioned so as to be attracted to a stationarily mounted body of Curie point metal 25, which can be heated above its Curie point by an electric heater 26, energized from the energized conductors 27 through a switch 28. It will be seen that the magnet 24 is kept in place by the valve stem 29 by which it is connected to the pressure release port valve member 23.

The dimensions of the magnet 24 are such that when it is attracted to the body of Curie point metal 25 and is almost touching the same, the valve member 23 will be tightly seated upon and closing the pressure release port 22. It will be seen that the port 20 is closed when the liftable valve member or disc 21 is resting thereon. The liftable valve member 21 is kept in operative position by the projections 31 and 32 which prevent it from rising too far.

The bleed valve 10 will be more readily understood if its operation is described. Accordingly, in operation, when the switch 28 is open the heater 26 will not be energized and the Curie point metal 25 will be below its Curie point, in which condition it is ferro-magnetic and the magnet 24 will be attracted thereto, thereby closing the pressure release port 22. Now, when the switch 28 is closed, the heater 26 will be energized and the body of Curie point metal 25 will be heated above its Curie point and will therefore become substantially non-magnetic. When this condition obtains, there will no longer be any attraction between the body of Curie point metal 25 and the magnet 24, and the magnet 24 will therefore drop to the position shown in the drawings, thereby moving the valve member 23 downwardly and opening the pressure release port 22. The fluid pressure from the conduit 11 will now lift the valve disc 21 off the port 20, thereby allowing the fluid to flow out through the outlet chamber 16. It will be seen that a portion of the fluid will pass over the valve disc 21 and into the chamber 17, from which it can escape through the port 22. The degree to which the valve disc 21 is raised will depend upon the amount of fluid pressure against it. Now, upon opening the switch 28, the electric heater 26 will be shut off, allowing the body of Curie point metal 25 to cool and again become ferro-magnetic, thereby causing the magnet 24 to again be attracted and to rise, carrying the pressure release port valve member 23 to the closed position. As soon as the port 22 is closed, it will be impossible for fluid to escape therethrough and pressure will start to build up in the chamber 17. This pressure acting on the top of the valve disc 21 will soon be sufficient to cause it to be forced down over and closing off the port 20. It is seen that the top area of the valve disc 21 exposed to the pressure is now much greater than the under-side area projecting from the port 22, and that the difference in force due to this difference in area will cause the valve disc 21 to be held down firmly over the port 20. The valve disc 21 will remain in this closed position until the pressure is released in the chamber 17 and the fluid pressure again lifts it off of its seat. The pressure can be released in the chamber 17 by closing the switch 28, which allows the valve member 23 to drop, as described hereinbefore.

With a view to applying my invention to diaphragm operated bleed valves, I have provided a valve shown, generally, at 75 in Figures 2 and 3 of the drawings, these figures showing the closed and opened positions of the valve 75, respectively. The valve 75 is located for operation in a conduit 76 and is made up principally of a valve body 77 with an inlet 78 and an outlet 79 connected in the conduit 76, as shown. The valve body 77 may be a casting of non-ferromagnetic metal. A baffle 81 forms an outlet chamber 82 with a port 83 leading thereinto. A valve cover 84 is provided for covering the valve body 77 and closing the top of the valve 75. The valve 75 is divided, in addition to the outlet chamber 82, into an upper chamber 85 and an inlet chamber 86, by a diaphragm 87. The chambers 85 and 86 are connected by a connecting port 88 which leads through the top of the inlet 78 into the chamber 90 of a block 91 which is mounted on the valve body 77. The chamber 90 is connected to the upper chamber 85 by a port 92. In order to close the main port 83, a valve member is provided therefor, shown generally at 93, which is carried by the diaphragm 87. The valve member 93 is made up of flanged washers 94 on either side of the diaphragm 87 and are held in place by a bolt 95 and nut 96, as shown. The face of the lower flanged washer 94 has secured thereto a soft washer 97 which tightly closes the port 83 when resting thereon.

With a view to opening and closing the inlet of the connecting port 88 into the chamber 90, a valve member 100 is provided. The valve member 100 carries thereon a permanent magnet 101 which is enclosed in the casing 102 with an outlet 103 therein, positioned over the block 91. In order that the magnet 101 will be not attracted to them, the block 91 and casing 102 are made of non-ferromagnetic material. In the top of the casing 102 a body of Curie point metal 104 is stationarily positioned, and it may be heated above its Curie point by an electric heater 105. The electric heater 105 may be energized from a pair of energized conductors 106 through a switch 107. The valve member 100 is so connected to the magnet 101 that when the magnet 101 is attracted to the body of Curie point metal 104, it will close a pressure release port 108 joining the chamber 90 and the casing 102, and when the magnet 101 is not attracted to the body of Curie point metal 104 it will drop and close the connecting port 88 leading into the chamber 90 of the block 91. Therefore, it may be said that the valve member 100 is common to the connecting port 88 and the pressure release port 108.

In operation, when the switch 107 is open, the body of Curie point metal 104 will be below its Curie point and, hence, ferro-magnetic, and the valve body 100 will be in the position shown in Figure 2. Fluid can flow from the conduit 76 through the inlet 78 and fill the inlet chamber 86. The fluid can further flow into the upper chamber 85 by way of the connecting port 88, chamber 90, and port 92. In this condition, the pressure of the fluid in the chamber 85 will hold the valve member 92 in the closed position over the main port 83, thereby acting to close the valve 75. When it is desired to open the valve 75 it is first necessary to close the switch 107, whereupon the body of Curie point metal 104 will be heated above its Curie point by the electric heater 105, thereby becoming non-magnetic and allowing the magnet 101 to drop. Upon the dropping of the magnet 101 the valve member 100 will take the position shown in Figure 3, i. e., opening the pressure release port 108 and closing the connecting port 88, thereby shutting the upper chamber 85 off from the inlet chamber 86 and releasing the fluid pressure in the chamber 85 out through the pressure release port 108. The fluid pressure in the inlet chamber 86 will force the diaphragm 87 up, according to its intensity, into a position as shown in Figure 3, thereby lifting the valve member 93 into the open position and opening the valve 75 to allow fluid flow therethrough. When the switch 107 is subsequently opened the valve 100 will again take the position shown in Figure 2 and the valve 75 will again be closed.

It will be understood, in connection with the description given above, that the switches 28 and 107 may be replaced by thermostatic switches or similar devices operating automatically in response to room temperature, liquid level, or other conditions as desired or expedient.

The time element in the operation of valves embodying my invention can be regulated by different designs. In all of the embodiments described, it is necessary to heat a body of Curie point metal above its Curie point in order to operate a valve. It is apparent that the time taken to heat the body of Curie point metal above its Curie point depends on the specific heat of the metal involved, and upon the size of heater used. Conversely, it is necessary for the body of Curie point metal to be cooled below its Curie point in order for a valve employing my invention to be turned off. The time necessary for this cooling will depend on the specific heat of the Curie point metal involved and on the rate at which heat can be conducted from it. In the embodiment of my invention shown in Figure 1, the fluid flowing through the valve 10 is in thermal conductive relation with the body of Curie point metal 25 and therefore this fluid tends to conduct heat from it and to cool it. This cooling effect causes the valve 10 to be turned off more rapidly. However, if this rapid action is not desired, the cooling action can be prevented as in the embodiment shown in Figures 2 and 3, in which the body of Curie point metal 104 is not in contact with the fluid flowing through the valve 75. This delayed action in the operation of valves embodying my invention prevents constant on-and-off operation as usually occurs on momentary current failures. Although in all of the embodiments of my invention hereinbefore described, a permanent magnet has been used as the source of magnetic flux, it is readily seen that electromagnets of suitable design could be used instead, with no resultant change in operation. However, when electromagnets are used the power required to operate them is in excess of that required when permanent magnets are used.

Since certain further changes can be made in the foregoing constructions and different embodiments of the invention may be made without departing from the scope thereof, it is intended that all matter shown in the accompanying drawings or described hereinbefore shall be interpreted as illustrative, and not in a limiting sense.

I claim as my invention:

1. In fluid flow control means, in combination, a valve body with an outlet chamber formed therein, a port leading into said outlet chamber, a valve member movable in response to pressure between the open and closed positions for opening and closing said port, a second chamber adjacent to said outlet chamber and shut off therefrom by said valve member when said valve member is in the closed position, a pressure release port for said second chamber, and means for opening and closing said pressure release port including a pressure release port valve member, a magnet attached to said pressure release port valve member, a body of Curie point metal disposed adjacent to the poles of said magnet, and means for selectively heating said body of Curie point metal, said pressure release port valve member being held in the closed position when said body of Curie point metal is below its Curie point and in the open position when above its Curie point, said first named valve member being forced to the closed position when the pressure release port is closed due to pressure built up in said second chamber, and said first named valve member being forced open by line pressure when said pressure release port is opened relieving the pressure within said second chamber.

2. In fluid flow control means, in combination, a valve body with an outlet chamber formed therein, a port leading into said outlet chamber, a free valve member for closing said port by resting thereon and liftable therefrom by fluid pressure, a valve cover forming a second chamber adjacent to said outlet chamber and shut off therefrom by said free liftable valve member when same is resting on said port, a pressure release port connecting said chambers, and means for opening and closing said pressure release port including a pressure release port valve member, magnet means connected with the pressure release port valve member, a body of Curie point metal, and electrical heater means selectively controlled for heating said body of Curie point metal above its Curie point, the magnet means being attracted to said body of Curie point metal when same is below its Curie point for lifting said pressure release port valve member to close the pressure release port and thereby causing sufficient pressure to be built up in said second chamber to force the liftable valve member down onto the first named port to close the same, the pressure thereafter building up to line pressure and being released when said body of Curie point metal is heated above its Curie point, thereby allowing said magnet means to fall and open the pressure release port.

3. In fluid flow control means, in combination, a valve body with an inlet and outlet chamber formed therein, a port leading into said outlet chambers, a valve member for closing said port, a valve cover forming a third chamber adjacent to said inlet and outlet chambers, said third chamber being shut off from said outlet chamber by said valve member when in the closed position and being shut off from said inlet chamber by a diaphragm which carries said valve member, a connecting port between said third chamber and said inlet chamber, a pressure release port for said third chamber, a common valve member for said connecting port and said pressure release port, said common valve member alternately closing and opening said connecting port and said pressure release port, and means for operating said common valve member, including magnet means carried by the common valve member, a body of Curie point metal, and electrical heater means selectively controlled for heating said body of Curie point metal above its Curie point, the magnet means being attracted to said body of Curie point metal when same is below its Curie point, thereby carrying the common valve member into position to close said pressure release port, said magnet means falling when said body of Curie point metal is heated above its Curie point, thereby moving the common valve member into position to close said connecting port, the pressure in said third chamber, when said pressure release port is closed, being built up to line pressure and acting on said diaphragm so as to cause the first-named valve member to close the port leading into said outlet chamber and thereby closing the bleed valve.

ROBERT A. WITTMANN.